United States Patent [19]

Milstein

[11] Patent Number: 4,941,282
[45] Date of Patent: Jul. 17, 1990

[54] WILDFLOWER SOD MAT AND METHOD OF PROPAGATION

[76] Inventor: Gene Milstein, 2152 E. Montane, Golden, Colo. 80401

[21] Appl. No.: 139,195

[22] Filed: Dec. 29, 1987

[51] Int. Cl.$^5$ ............................................... A01C 1/04
[52] U.S. Cl. ............................................ 47/58; 47/56
[58] Field of Search .................. 47/9, 56, 58, 61, 59, 47/60, 62, 63, 64, 65

[56] References Cited

U.S. PATENT DOCUMENTS

| | | | |
|---|---|---|---|
| 2,158,952 | 5/1939 | Timberlake | 47/9 |
| 2,605,589 | 8/1952 | Kuestner | 47/56 |
| 2,876,588 | 3/1959 | Tietz et al. | 47/58 |
| 2,923,093 | 2/1960 | Allen | 47/56 |
| 3,154,884 | 11/1964 | Amar et al. | 47/56 |
| 3,557,491 | 1/1971 | Franklin et al. | 47/9 |
| 3,863,388 | 2/1975 | Loads | 47/56 |
| 3,890,739 | 6/1975 | Blackburn | 47/56 |
| 3,914,901 | 10/1975 | Muldner | 47/56 |
| 3,991,514 | 11/1976 | Finck | 47/61 |
| 4,023,506 | 5/1977 | Robey | 47/56 |
| 4,190,981 | 3/1980 | Muldner | 47/56 |
| 4,232,481 | 11/1980 | Chamouland | 47/56 |
| 4,385,468 | 5/1983 | Yoshiaki | 47/61 |
| 4,539,038 | 9/1985 | Gombert | 47/9 |
| 4,786,550 | 11/1988 | McFarland et al. | 47/56 |

FOREIGN PATENT DOCUMENTS 461018 11/1949 Canada .
1290338 9/1972 United Kingdom .

OTHER PUBLICATIONS

New York Times Advertisement, section 2, p. X31, Apr. 19, 1959, Preseeded Products Company.
New York Times, Sunday Apr. 13, 1958, Section 2, p. X29.
The Sunday Star, Sunday Apr. 12, 1959, p. C-9.

Primary Examiner—Danton D. DeMille
Attorney, Agent, or Firm—Limbach, Limbach & Sutton

[57] ABSTRACT

An improved method of manufacturing and propagating wildflower sod mats, suitable for outdoor or indoor propagation. The improvement comprises a sod mat which is formed of a sheet or sheets of porous synthetic material, a layer of planting medium and viable wildflower seeds, so that upon germination, the root mass of the seeds intermesh with the porous synthetic material, forming the sod mat. In such form, the sod mat may be cut is economical and easily transported or stored for eventual planting. Thus the consumer is provided with an established sod mat, with viable germinated seedlings.

8 Claims, 1 Drawing Sheet

WILDFLOWER SOD MAT AND METHOD OF PROPAGATION

DESCRIPTION

1. Field of the Invention

This invention relates to wildflower sod mats, and specifically to the method of manufacturing and propagating such mats.

2. Background of the Invention

Sod mats and rolls have long been used in the seed and plant industry as a convenient device for the transport, storage and installation of seeds and seedlings. These products generally are prepared using or including a base sheet, upon which the propagating medium and seeds are deposited and a protective upper sheet or veil. These products also usually include some form of adhesive so as to bind the layers of propagating medium, seed, base sheet and protective covering together.

The drawbacks to such devices and methods were multiple. The devices were expensive to produce and costly to the consumer.

Often humus or mulch was used as the propagating medium. Humus or mulch expands upon exposure to moisture, thereby breaking down the base sheet material before final installation and planting of the roll or mat. Such expansion also has an additional disadvantage, since the seeds and the propagating medium can be washed away from the sod or roll due to the expansion.

Stitching of the sod or roll so as to form the layers of base sheet, medium, protective covering and seeds, also proved to be a disadvantage. Stitching tended to inhibit the expansion of the propagating medium, forming an irregular surface and decreasing the survival rate of seeds.

Base sheets were also problematic in the prior devices. Some base sheets were biodegradable upon wetting, making transport and storage difficult. Other sheets were impervious to moisture, creating a sod unit which was either moisture laden or moisture proof. In either instance, seed germination would be inhibited.

Furthermore, alternative types of base sheets were nonporous, discouraging meshing of the base sheet with the seedling root mass. Therefore, the base sheet acted as a carrier for the sod, rather than as an integral part.

It is an object of the present invention to provide a sod mat which is formed of a sheet or sheets of porous synthetic material, a layer of planting medium and viable seed, whereby the seedling roots bond these layers.

It is an object of the present invention to provide the consumer with an established sod mat, with viable germinated seedlings.

It is a further object of the present invention to provide a sod mat which is lightweight, yet sturdy.

It is another object of the present invention to provide a sod mat which is economical to produce and thus less expensive to the consumer.

It is still yet another object of the present invention to provide a sod mat which is capable of remaining viable after long periods of storage or transportation under a wide range of conditions.

It is yet a further object of the present invention to provide a sod mat which may be used to propagate wildflowers indoors or outdoors.

These and other features, objectives and advantages of the present invention will be more readily understood upon consideration of the following detailed description of certain embodiments of the present invention and the accompanying drawings.

DESCRIPTION OF THE PREFERRED EMBODIMENT

Figure 1:
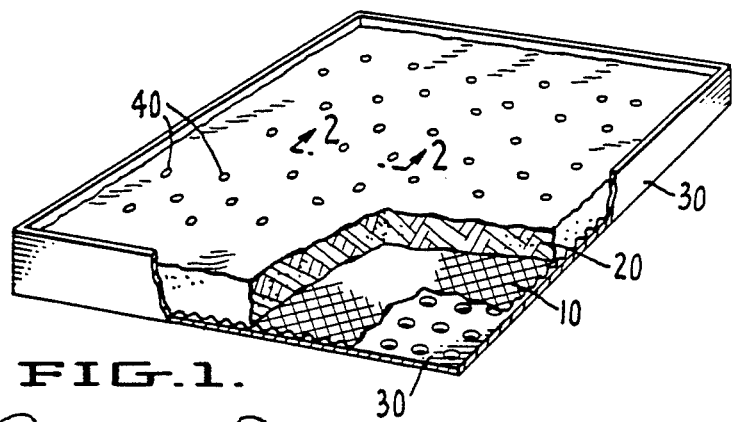
FIG. 1 is a sectional view of a wildflower sod mat suitable for indoor propagation according to this invention.

Referring to FIG. 1, a sheet of polyester fabric 10 is depicted with a layer of planting medium 20 deposited atop the polyester fabric sheet 10. A polyester fabric sheet 10 such as Reemay ® manufactured by E. I. duPont de Nemours of Wilmington Delaware is suitable for use. The planting medium layer 20 is approximately one inch deep.

The polyester fabric sheet 10 and planting medium layer 20 are placed in a carrier 30, such as a shallow plastic tray. Ideally, the carrier 30 should be at least ten inches by twenty inches (10" by 20"), so as to be easily carried by a person of average weight and height. The carrier 30 may be made of any lightweight plastic, with drainage holes located at the bottom of the carrier 30. The drainage holes should be sufficient in number, at least one per square inch, so as to permit adequate drainage of planting medium layer 20.

The planting medium layer 20 may be composed of various materials such as a composition of fifty percent (50%) sphagnum moss, forty-nine percent (49%) vermiculite or perlite, and one percent (1%) nutritive material, capable of sustaining plant growth. One such medium is Terra-Lite ® Redi-earth ® manufactured by W. R. Grace & Co.

Once deposited upon the polyester fabric sheet 10 and placed in carrier 30, the planting medium layer 20 is thoroughly moistened with water and then allowed to drain via the drainage holes.

Wildflower seeds 40 are sown over the planting medium layer 20, so that at a minimum the ratio of wildflower seeds 40 to planting medium layer 20 is one to two pounds of seeds 40 per five hundred to seven hundred-fifty square feet of planting medium layer 20.

The planting medium layer 20 is re-moistened and kept in that state until germination of seeds 40.

Slow release fertilizer such as Osmocote 14-14-14 manufactured by Sierra Chemical Company is applied to the seeds 40 and planting medium layer 20. The fertilizer should be applied to seeds 40 and planting medium layer 20, so that at a minimum, the ratio of fertilizer is one pound of fertilizer per hundred square feet of planted area. Application of the fertilizer should be performed between the third and fourth weeks after germination of seeds 40.

Seed growth should continue for at least six to twelve weeks, in order for seeds 40 to grow and produce a substantial root mass generally designated 60. Cultivation should take place in an temperate environment, such as a greenhouse, so that the temperature remains between sixty and sixty-five degrees Fahrenheit (60°–65° F.). The root mass 60 intertwines with the polyester fabric sheet 10 and planting medium layer 20 so as to form a solid sod mat 50.

After cultivation of the root mass 60, the sod mat 50 is placed in an environment where the minimum temperature is gradually reduced to between thirty to thirty-five degrees Fahrenheit (30°–35° F.). The temperature reduction may take place gradually over a period of one to three weeks.

The sod mat 50 may be maintained for storage and future planting by reducing the environmental temperature from thirty-five degrees Fahrenheit (35° F.) to a range of thirty to thirty-five degrees Fahrenheit (30°–35° F.). The sod mat 50 is dried by exposure to air to a minimum weight of four to five pounds (4–5 lbs).

Once at minimum weight, the sod mat 50 may be packed in storage containers, such as corrugated boxes with plastic liners. The sod mat 50 may then be stored in any cold storage system, such as a refrigerator, for a period of at least six months to a year. Before planted in an outdoor environment, the temperature of the sod mat 50 should be gradually increased, by exposure to heat, to the temperature of the planting environment.

Figure 2:
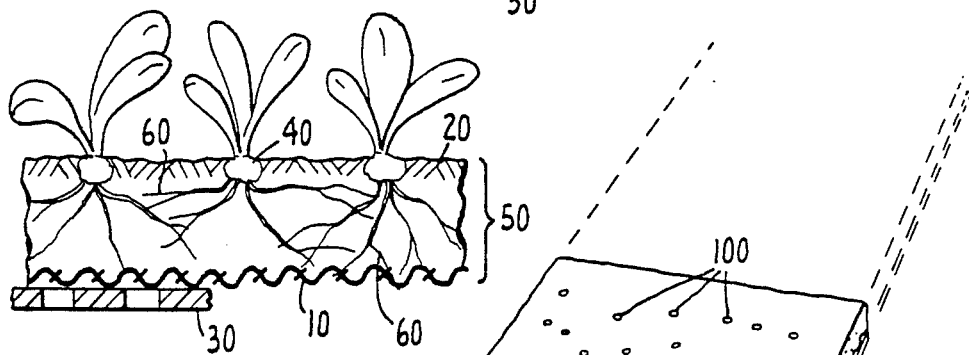
FIG. 2 is a detailed view on an enlarged scale of the wildflower sod mat suitable for indoor propagation according to FIG. 1.

FIG. 2 is a more detailed view of the embodiment depicted in FIG. 1.

Figure 3:
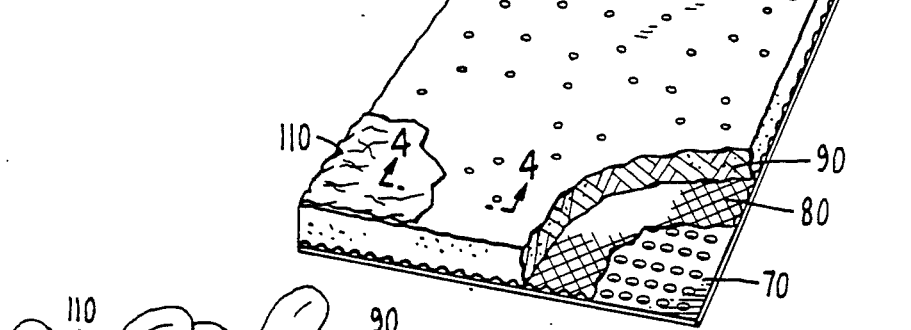
FIG. 3 is a sectional view of another embodiment of the present invention suitable for outdoor propagation.

Referring to FIG. 3, another embodiment of the present invention, suitable for outdoor propagation, is depicted featuring a sheet of perforated polyethylene 70, and a sheet of polyester fabric 80 placed atop the perforated polyethylene sheet 70.

A layer of planting medium 90 is deposited atop the sheet of polyester sheet 80. The planting medium layer 90 is approximately one half inch (½) deep.

Wildflower seeds 100 are sown over the planting medium layer 90, at a ratio similar to that disclosed previously. Once sown, wildflower seeds 100 and planting medium layer 90 are thoroughly moistened with water.

Slow release fertilizer such as Osmocote 14-14-14 may be applied to seeds 100 to aid germination in the second week after sowing.

Additionally, a sheet of light polyester spun bond fabric 110, such as Agryl P17 manufactured by International Paper Company may be placed atop the planting medium layer 90 to prevent erosion and provide protection from the wind. In addition to these features, the light polyester spun bond fabric sheet 110 contributes to weed prevention and aids in moisture and frost control.

Seed germination occurs between the first and third weeks after sowing. Seeds 100 should be watered evenly and regularly so as to spur growth. Cultivation of seeds 100 should continue for six to eighteen weeks, depending on climate and the time of year in which cultivation occurs, so as to allow production of a substantial root mass 120. The root mass 120 intermeshes with polyester fabric 80 and planting medium layer 90 so as to form a solid sod mat 130.

Once the sod mat 130 has formed, the perforated polyethylene sheet 70 may be removed and stored. The sod mat 130 may be divided into one and one-half foot (1½') to three foot (3') squares. These squares may then either be planted or stored under conditions, such as those outlined previously.

In the preferred embodiment, the sheets of perforated polyethylene 70 and polyester fabric 80 are three to four feet (3–4') wide and approximately one hundred to three hundred feet (100–300') long. The sheets 70 and 80 are laid out in adjacent rows so as to allow clear access to the sod mat 130 for propagation and harvesting purposes.

It should be noted that while the present invention is suitable for the propagation of wildflowers, the propagation technique disclosed herein is equally applicable to domesticated perennial and annual plants.

The following germination table is provided to identify some species which may be included in the wildflower selection disclosed in the preferred embodiment. Germination schedules for those species are also included.

TABLE A

| Scientific Name | Common Name | Germination |
| --- | --- | --- |
| Rudbeckia hirta | ("Black-Eyed Susan") | 1 week |
| Chrysanthemum lencanthemum | ("Ox-Eye Daisy") | 1 week |
| Cheiranthus allionii | ("Siberian Wallflower") | 1 week |
| Cerastium biebersteinii | ("Snow-in Summer") | 1 week |
| Lotus corniculatus | ("Bird's Foot Trefoil") | 1 week |
| Heperia matronais | ("Dame's Rocket") | 1 week |
| Linum perenne lewisii | ("Blue Flax") | 1 week |
| Ratibida columnifera | ("Prairie Coneflower") | 2 weeks |
| Coreopsis lanceolata | ("Perennial Gaillardia") | 2 weeks |
| Viola cornuta | ("Johnny Jump-Up") | 2 weeks |
| Dianthus deltoides | ("Maiden Pinks") | 2 weeks |
| Arabis alpina | ("Rock Cress") | 2 weeks |
| Penstamon strictus | ("Rocky Mountain Penstemon") | 3 weeks |
| Oenothera missouriensis | ("Dwarf Evening Primrose") | 3 weeks |
| Echinacea purpurea | ("Purple Coneflower") | 3 weeks |

Figure 4:
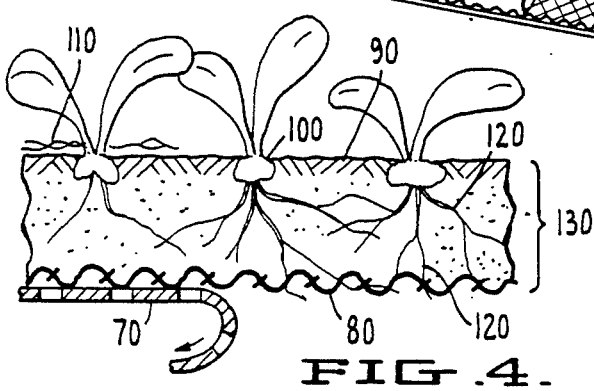
FIG. 4 is a detailed view on an enlarged scale of the wildflower sod mat suitable for outdoor propagation according to FIG. 3.

FIG. 4 is a more detailed view of the embodiment depicted in FIG. 3.

The terms and expressions which have been employed herein are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A new and improved method of propagating wild flowers in sod mats outdoors on the ground comprising the following steps:

providing a sheet of perforated polyethylene;

positioning a sheet of polyester fabric atop said perforated polyethylene;

depositing a layer of planting medium on said perforated polyethylene polyester fabric combination;

spreading viable wild flower seed over said medium;

moistening said medium and seeds; germinating seeds in said medium, such that the roots of said seedlings mesh with the resulting perforated polyethylene sheet and polyester fabric combination forming a sod mat;

removing said mat from said perforated polyethylene polyester fabric combination;

and cutting said sod mat into sections for packaging, storage and installation.

2. A mat according to claim 1 wherein said polyester fabric is spun bonded fabric.

3. A mat according to claim 1 wherein said planting medium is composed of one or more of the following selected from the group comprising sphagnum moss, vermiculite, perlite, and nutrients.

4. A new and improved method of propagating wild flowers in sod mats indoors comprising the following steps:

providing a sheet of polyester fabric;

depositing a layer of planting medium on said sheet of polyester fabric;

spreading viable wildflower seed over said medium layer;

moistening said medium layer; germinating said seed under growing conditions of light, temperature and moisture, so as to form a root mass, such that said sheet, said medium layer and said root mass form a sod mat;

applying fertilizer to said mat three to four weeks after germination;

maintaining said sod mat in growing status in the temperature range of sixty to sixty-five degrees Fahrenheit for six to twelve weeks;

reducing the temperature minimum range gradually to thirty to thirty-five degrees Fahrenheit at the end of such period;

reducing the moisture content of said sod mat so as to prevent decay of leaves and said seeds; and storing said sod mats in a storage container wherein said container maintains said mats at a temperature of thirty to thirty-five degrees Fahrenheit.

5. A method according to claim 4 wherein a ratio of one to two pounds of said seed is spread over five hundred to seven hundred-fifty square feet of said medium.

6. A method according to claim 4 wherein said fertilizer is a slow release fertilizer.

7. A method according to claim 4 wherein said mat is stored for six months to one year.

8. A new and improved sod mat for growing wildflowers in sod mats outdoors on the ground comprising;

a sheet of perforated polyethylene;

a sheet of polyester fabric positioned atop said polyethylene;

a layer of sterile soil deposited upon said perforated polyethylene polyester fabric sheets;

a layer of seeds spread upon said soil and said sheets; and whereby upon germination of said seeds, the roots of the resulting seeds pass through said soil and said sheets, said roots maintaining the layers as a mat.

* * * * *